United States Patent

[11] 3,601,469

| [72] | Inventor | Anthony Siksai<br>2705 Lahser Road, Bloomfield Hill, Mich. |
|---|---|---|
| [21] | Appl. No. | 848,817 |
| [22] | Filed | Aug. 11, 1969 |
| [45] | Patented | Aug. 24, 1971 |

[54] ROTARY POLARIZER
16 Claims, 8 Drawing Figs.

[52] U.S. Cl. .................................................. 350/153,
40/106.51, 350/157, 350/159
[51] Int. Cl. ...................................................... G02b 5/30
[50] Field of Search ........................................ 350/147,
153, 157; 40/106.51–106.53

[56]     References Cited
UNITED STATES PATENTS

| 2,329,543 | 9/1943 | Land | 350/153 |
| 2,440,105 | 4/1948 | Land et al. | 350/153 |
| 2,475,921 | 7/1949 | Smith | 350/153 |
| 2,506,134 | 5/1950 | Burchell | 350/153 X |
| 3,054,204 | 9/1962 | Yates | 350/153 X |
| 3,497,979 | 3/1970 | Buitkus | 40/106.53 |

*Primary Examiner*—David Schonberg
*Assistant Examiner*—Paul R. Miller
*Attorney*—Lane, Aitken, Dunner and Ziems ABSTRACT: A rotary polarizer for use with animated display devices, wherein only a percentage of the polarizer is polarized. Therefore, part of the light passing through the polarizer is polarized and the remaining portion passes through without being polarizing. When used in an animated display device, such a polarizer produces a smooth less pulsating motion and a brighter more vivid display.

PATENTED AUG 24 1971 3,601,469

INVENTOR
ANTHONY SIKSAI

BY
Lane, Aitken, Dunner & Ziems
ATTORNEYS

INVENTOR
ANTHONY SIKSAI

BY Lane, Aitken, Dunner & Ziems
ATTORNEYS

INVENTOR
ANTHONY SIKSAI

BY Lane, Aitken, Dunner & Ziems
ATTORNEYS

ROTARY POLARIZER

BACKGROUND OF THE INVENTION

There are many different types of animated display devices which employ rotary polarizers for animating art work illuminated by light passing through the rotary polarizer. My pending Pat. application Ser. No. 709,138 filed on Feb. 28, 1968, entitled "Animated Display Device," and my earlier U.S. Pat. No. 3,437,401 granted on Apr. 8, 1969 and the U.S. Pat. Nos. to Burchell, et al. 2,393,968 granted on Feb. 5, 1946 and Yates 3,054,204 granted on Sept. 18, 1962 are examples of such prior art.

In accordance with this prior art, the animated displays comprise a transparency having the picture to be animated painted on one face. A rotatable disc made of a sheet of polarizing material forms the rotary polarizer and is positioned behind the transparency. A suitable light source is positioned behind the polarizer to pass light through the polarizer and transparency. A stationary sheet of polarizing material, commonly referred to as an analyzer, is interposed between the transparency and rotary polarizer. With this arrangement the transparency alternately appears bright and dark each time the polarizer rotates through 90° because maximum light passes through the transparency when the axes of polarization of the polarizer and analyzer are aligned with one another, and minimum light passes through when the polarizer rotates 90° so that the axes are at right angles to one another.

The prior art patents and my patent and patent application disclose different techniques for altering this bright-dark or off-on effect into a traveling shadow effect for producing the illusion of motion on different parts of the picture being animated. However, one problem with this prior art is that the rotary polarizer filters out about one-half of the light passing therethrough so that the brightness of the picture being animated is reduced, or conversely, a much larger light source must be employed. In addition, the bright-dark effect produces very bright and dark traveling shadows and a very intense motion.

SUMMARY OF THE INVENTION

In accordance with the present invention a percentile polarization technique is employed wherein only a percentage of the area of the rotary polarizer is polarizing with the remaining area not being polarizing. Thus only a percentage of the light passing through the rotary polarizer is polarized. By controlling the percentage involved and the pattern of the polarizing and nonpolarizing areas, the intensity of the motion created for the picture to be animated can be controlled, and a smoother, less pulsating motion can be obtained because the contrast between the bright and dark spots is reduced. Since more light passes through the polarizer as compared to the prior art polarizers, the picture being animated will be brighter and more vivid. In addition, special effects can be achieved by embossing motion patterns on the rotary polarizer itself in accordance with the technique of my earlier patent.

The percentile polarizing can be achieved in a number of ways. The circular disc can be a supporting sheet of transparent or translucent material with segments of polarizing material adhered to the supporting sheet in a random or controlled pattern. The supporting disc can be made spot polarizing by inking areas with a well-known polarizing ink. The entire disc can be made polarizing and the polarizing then cancelled in certain areas by embossing, removing or overprinting areas of the polarizer. The polarizing disc can also be covered with light depolarizing agents, such as translucent paper and various kinds of chemical coatings which scatter or destroy the polarized light waves.

The present invention thus provides a greater latitude for the creation of artistically more refined animation for displays and visual aids in general. It also produces brighter, more vivid visual aids and displays. Other objects and features of novelty of the invention will become apparent to one skilled in the art when referred to the following description, taken in conjunction with the accompanying drawings wherein:

DESCRIPTION OF THE PREFERRED EMBODIMENTS

Figure 1:
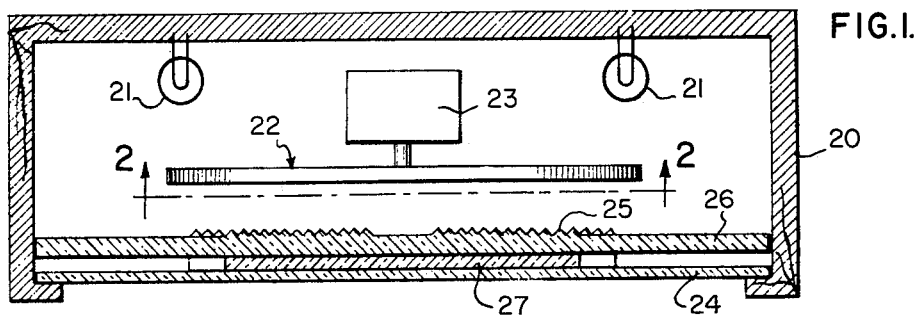
FIG. 1 is a schematic view of an animated display device employing a rotary polarizer.

Referring to FIG. 1 an animated display device is shown which is the same as that shown in my earlier patent with the exception that only a percentage of the rotary polarizer 22 is polarizing. The animated display comprises a light box 20 having a rectangular opening in the front face thereof. An electric motor and gear reduction unit 23 is mounted within the light box 20 for rotating the rotary polarizer 22 which is mounted on the end of the output shaft of the reduction unit. A pair of light bulbs 21 are mounted behind the rotary polarizer 22 to pass light therethrough. A transparency 24 having the design or art work to be animated is positioned over the opening in the front face of the light box. The transparency can be any suitable transparent or translucent sheet material such as glass or plastic through which light can pass and upon which the design or art work to be animated can be applied in a suitable manner, such as by drawing, photographic process, printing, lithographic process, coloring and so forth. A sheet of polarizing material 27 is positioned behind the transparency 24 and a light intercepting sheet 26 is positioned behind the polarizing sheet 27. All three sheets are preferably bonded together by suitable transparent adhesive or cement. As shown in FIG. 1 the thickness of these sheets and the rotary polarizer are exaggerated for the sake of clarity.

A detailed description of the light intercepting sheet 26 and the operation of the animated display of FIG. 1 is contained in my earlier patent. Briefly, however, a pattern of embossed motion lines 25 is formed on the rear face of the light intercepting sheet 26 so as to alter the off-on effect of the polarizing sheet 27 and rotary polarizer 22 in a manner to animate the art work on the transparency 24.

Figure 2:
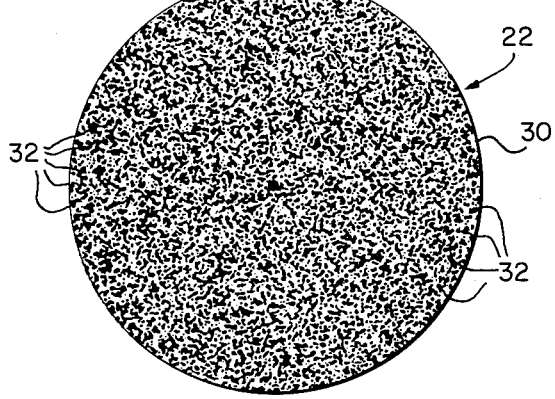
FIG. 2 is a view of the face of the rotary polarizer taken along the line 2—2 of FIG. 1.

Referring to FIG. 2, the rotary polarizer 22 comprises a circular supporting disc or sheet 30 of a suitable transparent plastic material having irregular pieces of polarizing material 32 randomly dispersed over and secured to one face of the support disc 30. Consequently, only the light passing through these pieces of polarizing material will be polarized by the rotary polarizer while the light passing through the areas in between these pieces will not be polarized.

The effect in the animated display of FIG. 1 is to provide an animation or motion to the art work on the transparency 24 which is of a more controlled intensity, smoother and less pulsating. Also, the transparency is brighter and more vivid than it would be if the entire area of the rotary polarizer were polarizing as in the prior art. By making the pattern a more finely grained pattern, a more subdued motion for animating the art work will be provided. Also, the percentage of polarizing areas can be increased or decreased as desired.

Still referring to FIG. 2, the supporting disc 30 can be made spot polarizing using conventional polarized inking techniques to produce the random irregular polarizing areas 32. Also, the entire face of the supporting disc 30 can be made polarizing and the nonpolarizing areas formed in a number of ways, such as, by covering these areas with a translucent material or coating which scatters or destroys the polarized light waves, embossing these areas with closely spaced dots as described in my pending application, or even cutting and removing these areas.

Figure 3:
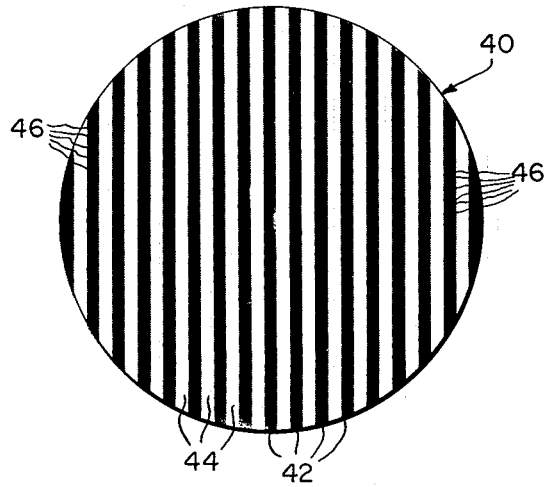
FIG. 3 is a view similar to FIG. 2 illustrating another embodiment of the invention.

Referring to FIG. 3, a rotary polarizer 40 is shown in which the entire face of the disc is made polarizing. The polarizer 40 is rendered nonpolarizing, as will be described, along parallel spaced strips 42. The width and spacing of the nonpolarizing strips 42 and the polarizing strips 44 therebetween is such that the total area of the polarizing strips 44 is equal to 50 percent of the area of the polarizer 40, but this can be changed as desired. The strips 42 are rendered nonpolarizing by embossing the areas of the polarizer within the strips with an embossing plate as described in my earlier patent. However, rather than embossing motion lines thereon, as described in my patent, the strips are embossed with a plurality of closely and evenly spaced dots or depressions 46. As explained in my patent, embossing the lines under heat and pressure reorients the molecules of the material in accordance with the direction of the lines. However, in the case of the dots 46 the oriented polarizing molecules of the polarizer 40 reorient themselves in circular paths around each of the dots to destroy the polarizing effect that would otherwise be present in the strips 42. More specifically, the polarizing molecules of a polarizing disc such as the rotary polarizer 40 are oriented in the same direction as the axis of polarization. By embossing the dots 48 on the strips 42, this orientation of the molecules is changed in the strip to a circular pattern around the dots, which eliminates the polarizing effect.

Figure 4:
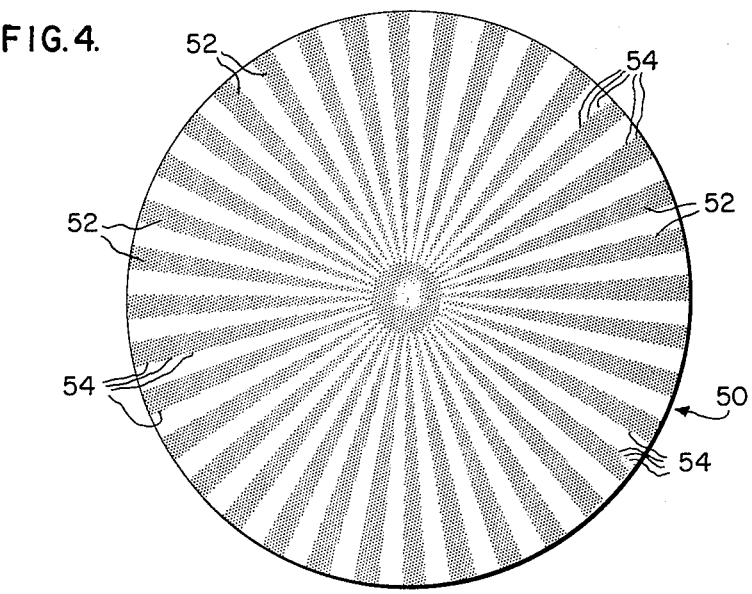
FIG. 4 is a view similar to FIG. 2 illustrating another embodiment of the invention.

Referring to FIG. 4, a rotary polarizer 50 is illustrated in which the entire surface of the polarizer is polarizing with radially extending pie-shaped strips 52 rendered nonpolarizing by embossed dots or depressions 54 as described in FIG. 3. By positioning the strips rendered nonpolarizing radially instead of in parallel strips across the face of the polarizer as in FIG. 3 a somewhat different animating effect is achieved when the polarizer is used in the prior art display devices.

Figure 5:
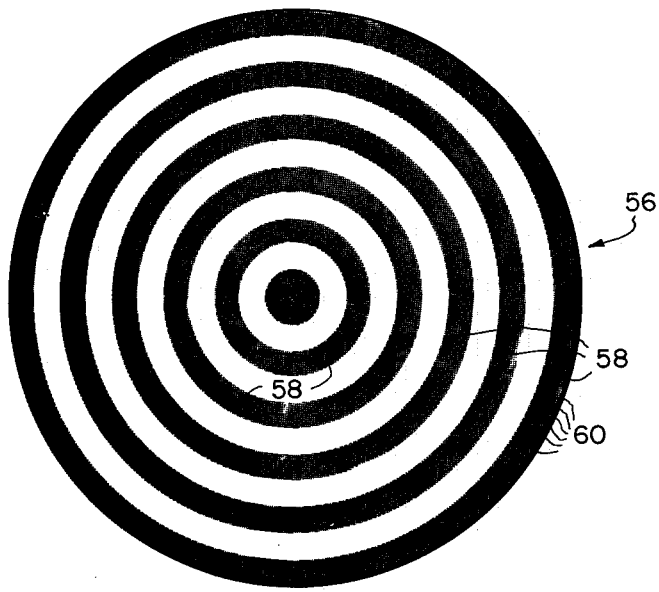
FIG. 5 is a view similar to FIG. 2 illustrating another embodiment of the invention.

Referring to FIG. 5, a rotary polarizer 56 is illustrated wherein the polarizer is a Vectograph or H-sheet and concentric rings 58 thereon are made polarizing by a polarizing ink as described in my patent. This leaves the rings in between nonpolarizing so that the rotary polarizer 56 is 50 percent polarized and 50 percent depolarized.

Figure 6:
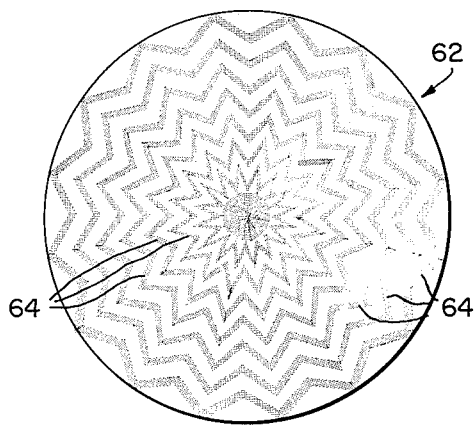
FIG. 6 is a view similar to FIG. 2 illustrating another embodiment of the invention.

Referring to FIG. 6, an irregular shaped rotary polarizer 62 is illustrated having concentric sawtooth bands rendered nonpolarizing by the dots or depressions embossed in the polarized face of the rotary polarizer as previously described. By virtue of the sawtooth configuration of the annular bands 64, the polarizing material between the bands will intercept the light passing therethrough as the polarizer rotates in a different manner than the concentric rings of FIG. 5.

Figure 7:
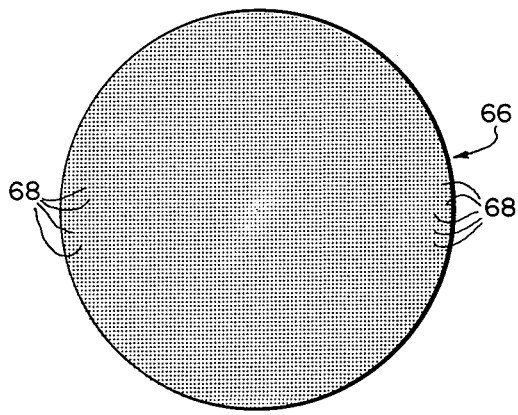
FIG. 7 is a view similar to FIG. 2 illustrating another embodiment of the invention.

Referring to FIG. 7, a rotary polarizer 66 is shown having its entire face made polarizing with portions thereof rendered nonpolarizing by a plurality of evenly spaced embossed dots or depressions 68 as previously described. However, the dots 68 are spaced further apart than the dots in the areas rendered nonpolarizing of the rotary polarizers in FIGS. 3–6 so that much of the area in between the dots remains polarizing. The percentage made polarizing can vary, but as shown in FIG. 7, 75 percent of the rotary polarizer 66 remains polarizing and 25 percent is rendered nonpolarizing by the embossed dots 68. Alternatively, a circular sheet of polarizing material could be punched with holes in place of the dots so that part of the light will pass through the holes without being polarized and the remaining part of the light will pass through the disc itself and be polarized.

Figure 8:
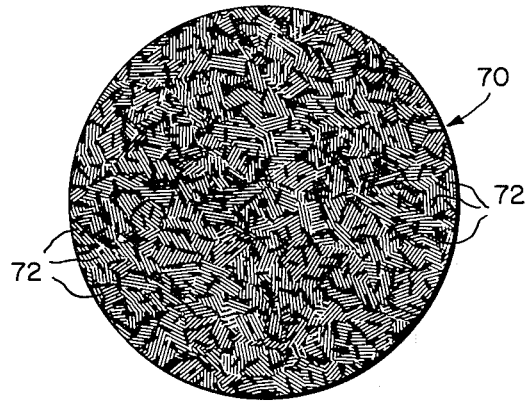
FIG. 8 is a view similar to FIG. 2 illustrating another embodiment of the invention.

Referring to FIG. 8, a rotary polarizer 70 is shown having its entire face made polarizing with random and irregular areas 72 rendered nonpolarizing by embossing lines thereon in a random motion pattern similar to that illustrated in FIG. 26 of my earlier patent. The oriented polarizing molecules of the polarizer 70 will be reoriented by the embossed lines in a direction perpendicular to the embossed lines. The light passing through the embossed areas 72 will be polarized, but twisted with respect to the light passing through the polarizing areas of the rotary polarizer which do not have the embossed lines thereon. This creates a special effect wherein the areas of the rotary polarizer which are not embossed create the same motion effect as the polarizer of FIG. 2, for example. However, the embossed line areas will superimpose on, or compliment this effect with, an additional polarizing effect through the embossed areas which comes into play at a variety of different angular positions of the rotary polarizer. The percentage of embossed area can be controlled and the distribution of the embossed lines of different directions can be controlled to produce interesting effects in the picture being animated.

What I claim is:

1. A movable polarizer for an animated display device comprising a sheet of material through which light can pass, and means for forming said sheet into a plurality of randomly dispersed light polarizing areas and nonpolarizing areas.

2. The polarizer of claim 1 wherein said polarizing areas comprise at least 50 percent of the combined polarizing and nonpolarizing areas.

3. The polarizer of claim 1 including means for rotating said polarizer about an axis passing through the center of said polarizer and perpendicular to it.

4. The invention of claim 3 including a picture to be animated and means intercepting the polarized light from said polarizer and altering it to animate said picture.

5. A movable polarizer for an animated display device comprising a sheet of material through which light can pass, said sheet being divided into a plurality of small areas with part but not all of said areas being adapted to polarize the light passing therethrough, and the remaining areas including indentations which orient the polarizing molecules in a manner to render said remaining areas nonpolarizing, said indentations being spaced far enough apart to leave undisturbed polarizing areas between said nonpolarizing areas.

6. The polarizer of claim 5 wherein said polarizing areas comprise at least 50 percent of the combined polarizing and nonpolarizing areas.

7. The polarizer of claim 5 including means for rotating said polarizer about an axis passing through the center of said polarizer and perpendicular to it.

8. The invention of claim 6 including a picture to be animated and means intercepting the polarized light from said polarizer and altering it to animate said picture.

9. A movable polarizer for an animated display device comprising a sheet of material through which light can pass, said sheet being divided into a plurality of small areas with part but not all of said areas being adapted to polarize the light passing therethrough, and the remaining areas including indentations which orient the polarizing molecules in a manner to render said remaining areas nonpolarizing, said indentations being of such size and spaced close enough together to form continuous nonpolarizing areas.

10. The polarizer of claim 9 wherein said polarizing areas comprise at least 50 percent of the combined polarizing and nonpolarizing areas.

11. The polarizer of claim 9 including means for rotating said polarizer about an axis passing through the center of said polarizer and perpendicular to it.

12. The invention of claim 9 including a picture to be animated and means intercepting the polarized light from said polarizer and altering it to animate said picture.

13. A movable polarizer for an animated display device comprising a sheet of material through which light can pass, said sheet being divided into a plurality of small areas one portion of said areas being adapted to polarize the light passing therethrough and another portion of said areas being nonpolarizing, said polarizing areas and said nonpolarizing areas being in a repeating alternating pattern.

14. The polarizer of claim 13 wherein said polarizing areas comprise at least 50 percent of the combined polarizing and nonpolarizing areas.

15. The polarizer of claim 13 including means for rotating said polarizer about an axis passing through the center of said polarizer and perpendicular to it.

16. The invention of claim 13 including a picture to be animated, means intercepting the polarized light from said polarizer and altering it to animate said picture.

UNITED STATES PATENT OFFICE
CERTIFICATE OF CORRECTION

Patent No. 3,601,469          Dated  6/21/72

Inventor(s) Anthony Siksai

It is certified that error appears in the above-identified patent and that said Letters Patent are hereby corrected as shown below:

Abstract, line 6 instead of "a smooth" should be --smoother--

Page 3, line 30 "48" should be --46--

Page 3, line 47 "polarized" should be --polarizing--

Page 3, line 47 "depolarized" should be --non-polarizing--

Page 3, line 51 "polarized" should be --polarizing--

Signed and sealed this 12th day of September 1972.

(SEAL)
Attest:

EDWARD M. FLETCHER, JR.
Attesting Officer

ROBERT GOTTSCHALK
Commissioner of Patents